A. BLOCK.
PAPER FEEDING MECHANISM.
APPLICATION FILED DEC. 20, 1915.
1,230,456.
Patented June 19, 1917.
5 SHEETS—SHEET 1.
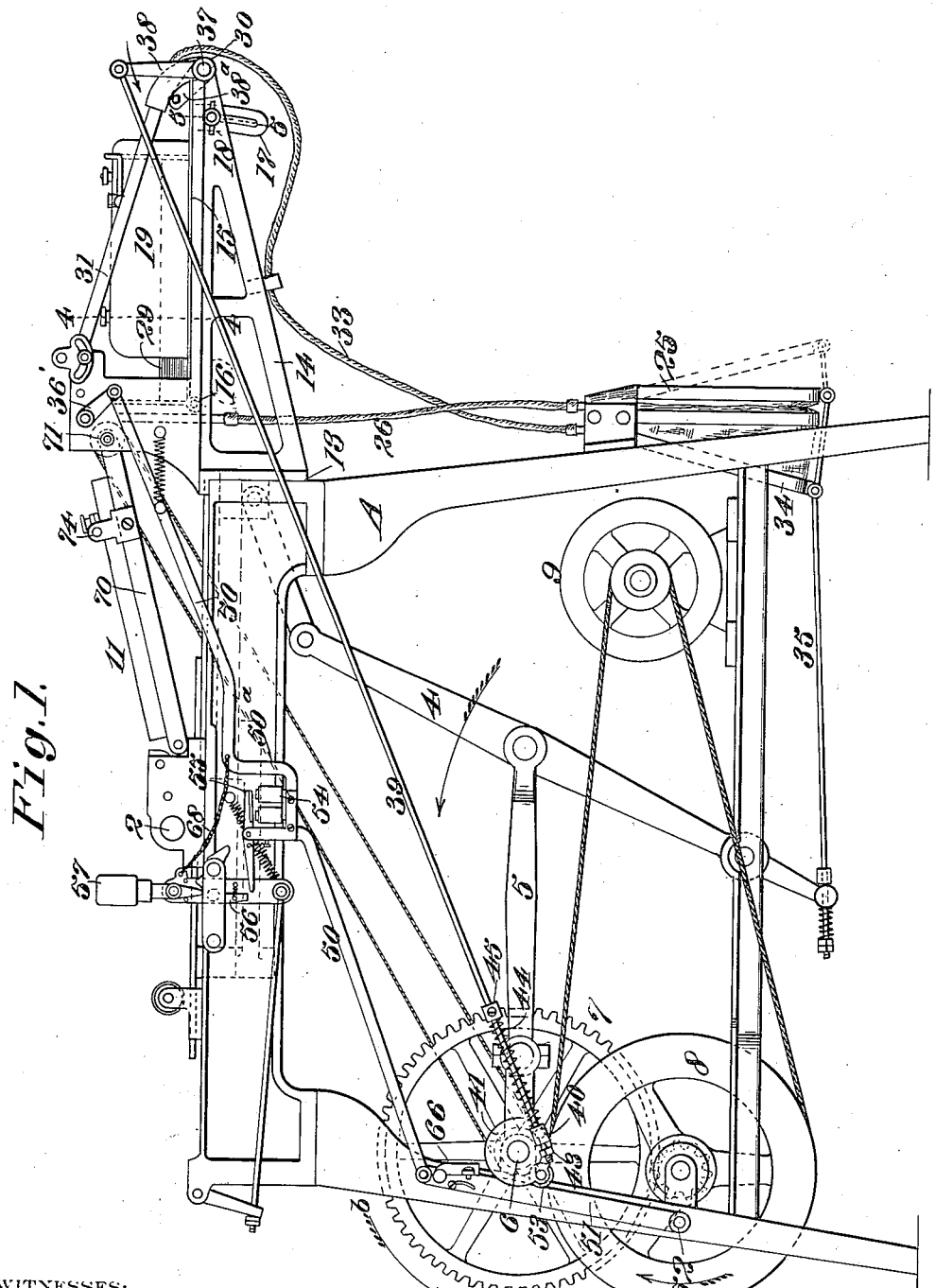
Fig. 1.
WITNESSES:
Charles Pickles
Thos. Forstberg
INVENTOR
Abraham Block.
BY 
ATTORNEYS A. BLOCK.
PAPER FEEDING MECHANISM.
APPLICATION FILED DEC. 20, 1915.
1,230,456.
Patented June 19, 1917.
5 SHEETS—SHEET 2.
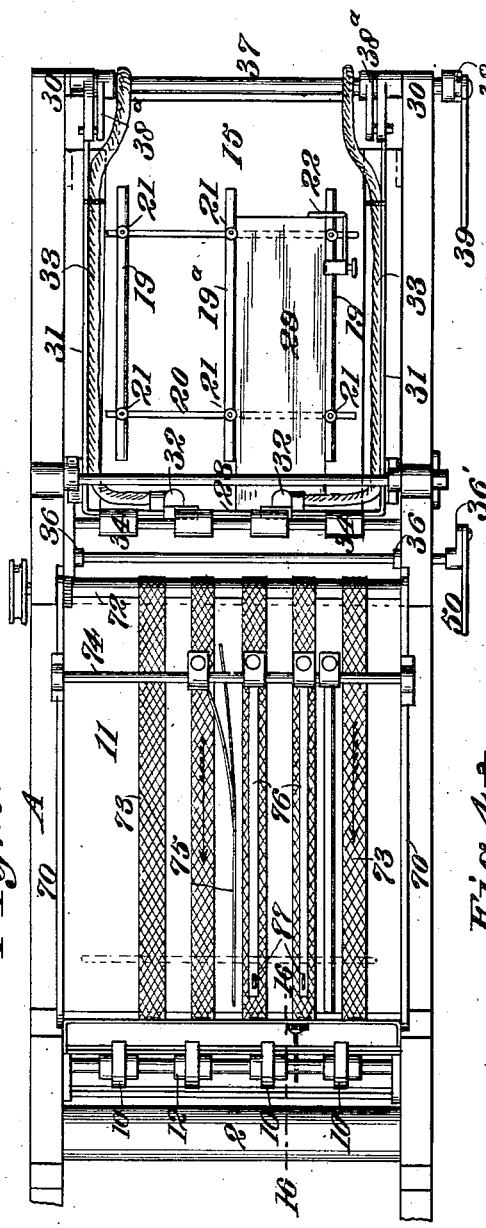
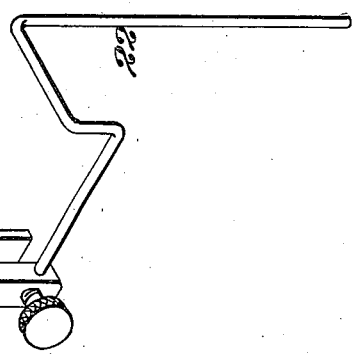
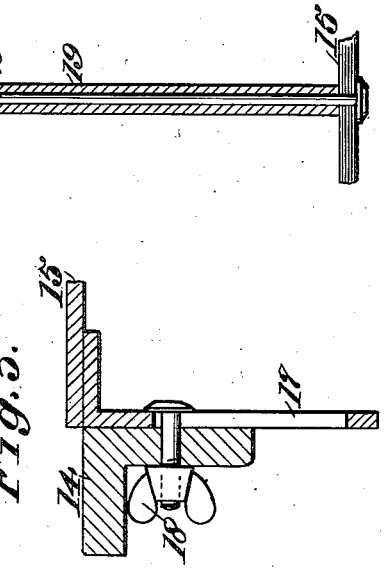
WITNESSES:
Charles Rohles
Thos. Castberg
INVENTOR
Abraham Block
BY Strong & Townsend
ATTORNEYS

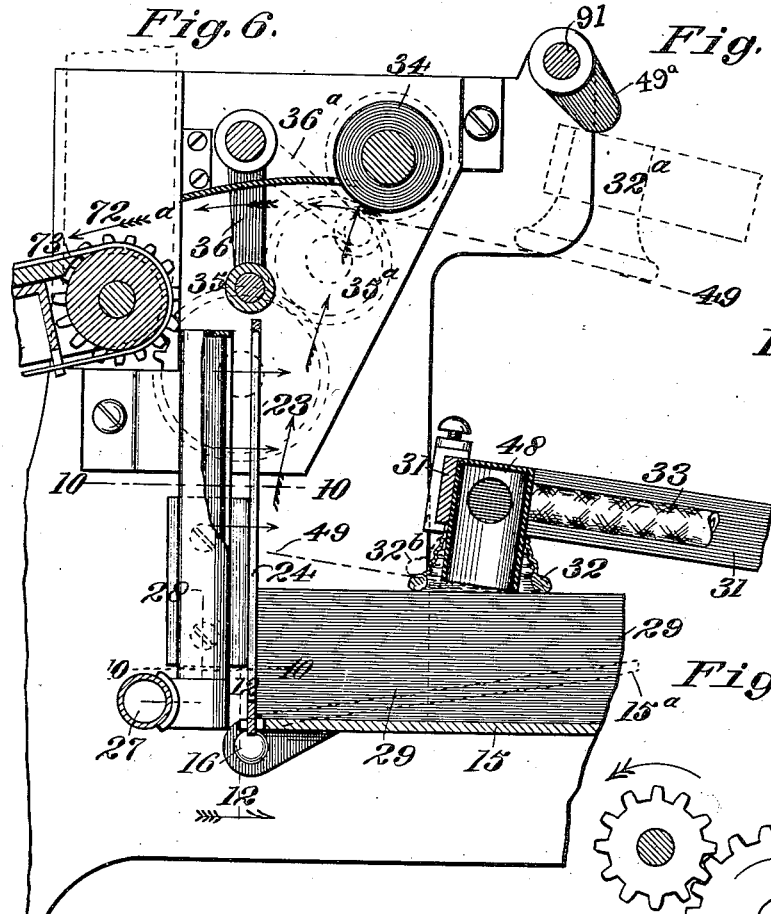
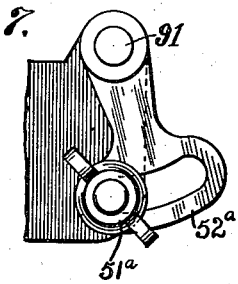
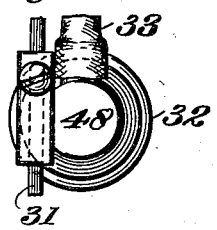
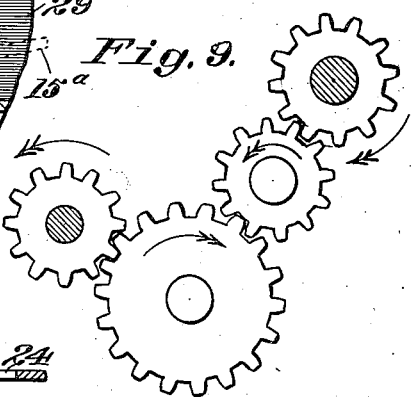
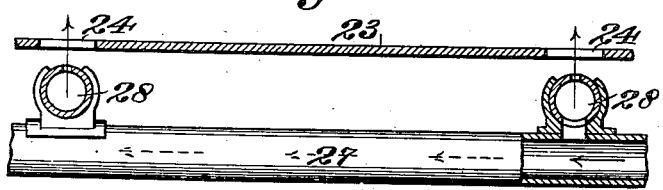
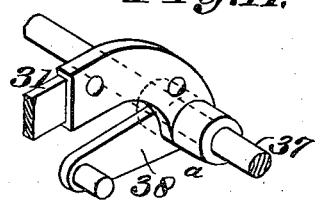
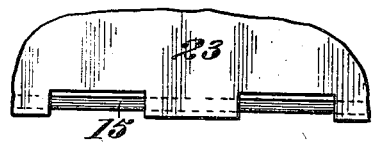

A. BLOCK.
PAPER FEEDING MECHANISM.
APPLICATION FILED DEC. 20, 1915.
1,230,456.
Patented June 19, 1917.
5 SHEETS—SHEET 4.
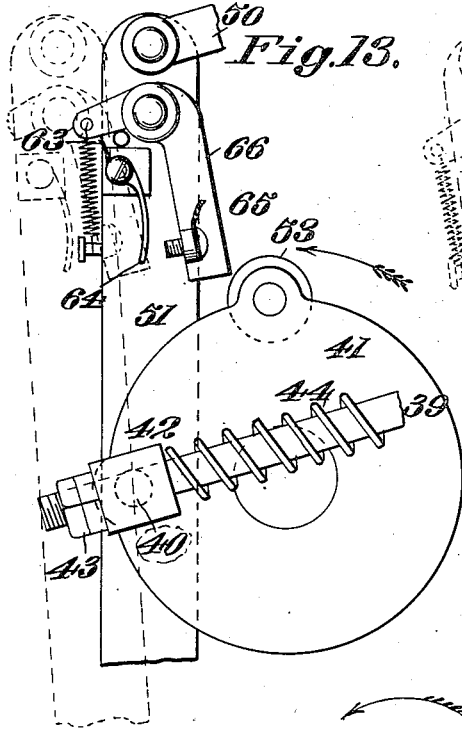
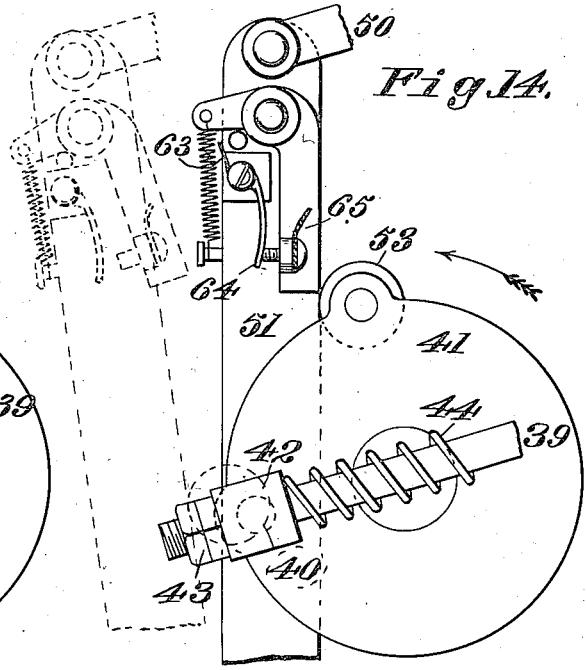
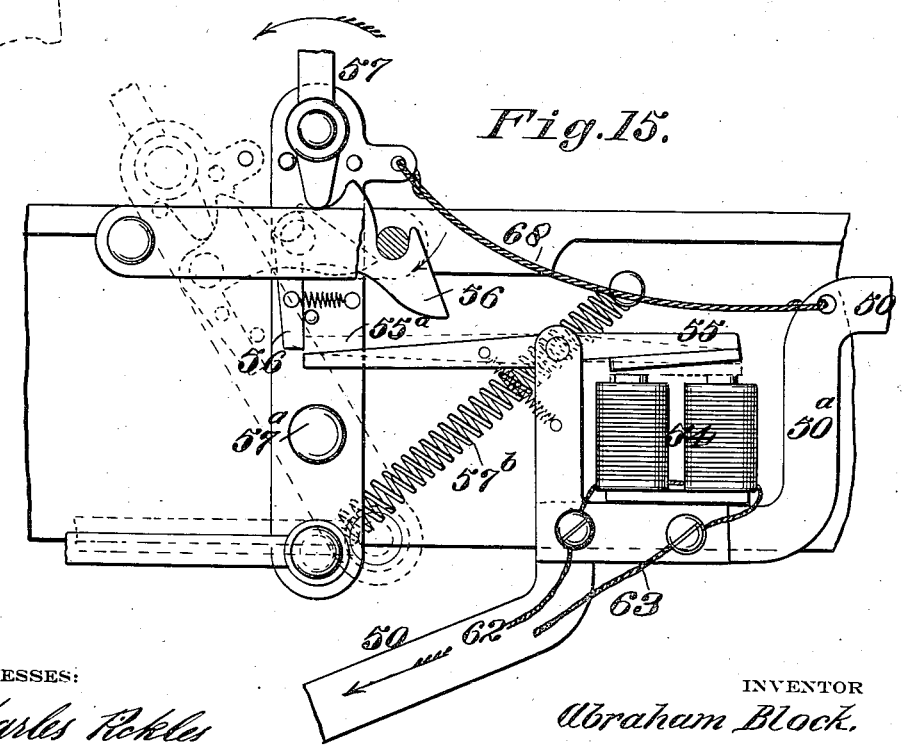
WITNESSES:
Charles Rokler
Thos. Tostberg
INVENTOR
Abraham Block.
BY Strong & Townsend
ATTORNEYS A. BLOCK.
PAPER FEEDING MECHANISM.
APPLICATION FILED DEC. 20, 1915.
1,230,456.
Patented June 19, 1917.
5 SHEETS—SHEET 5.
Fig. 16.
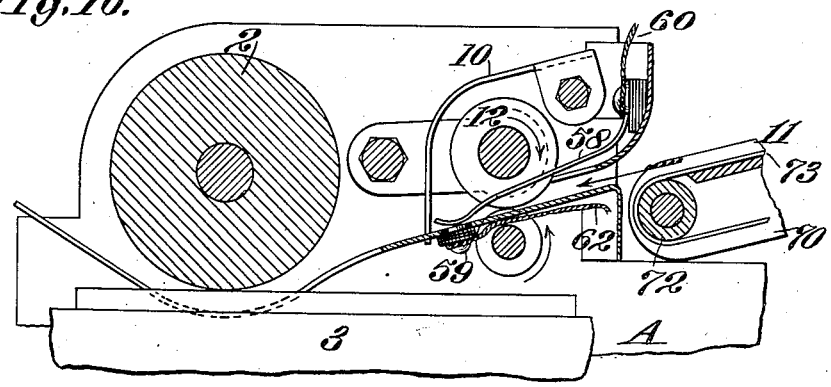
Fig. 17.
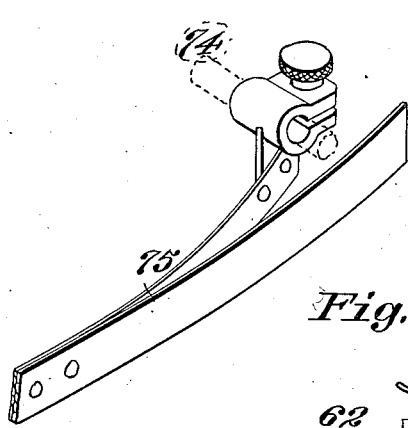
Fig. 18.
Fig. 20.
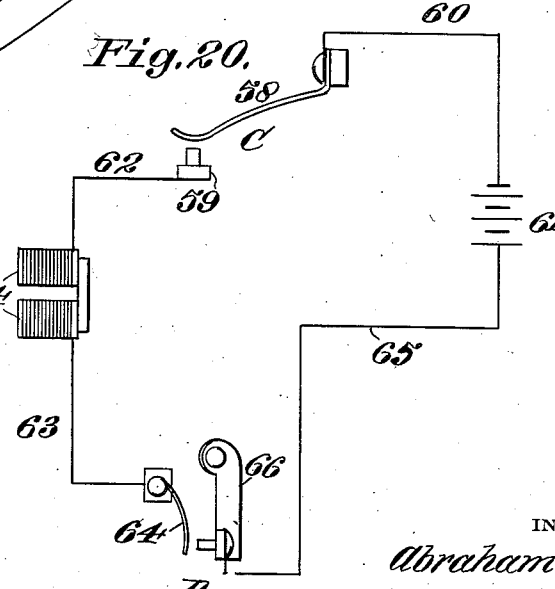
Fig. 19.
WITNESSES:
Charles Rickles
Thos. Castberg
INVENTOR
Abraham Block,
BY Strong & Townsend
ATTORNEYS

UNITED STATES PATENT OFFICE.

ABRAHAM BLOCK, OF SAN FRANCISCO, CALIFORNIA.

PAPER-FEEDING MECHANISM.

1,230,456.  Specification of Letters Patent.  Patented June 19, 1917.

Application filed December 20, 1915. Serial No. 67,760.

*To all whom it may concern:*

Be it known that I, ABRAHAM BLOCK, a citizen of the United States, residing at the city and county of San Francisco and State of California, have invented new and useful Improvements in Paper-Feeding Mechanism, of which the following is a specification.

This invention relates to a paper feeding mechanism particularly adapted for use on printing presses.

One of the objects of the present invention is to provide a positive paper feeding mechanism, whereby paper, cardboard, envelops, or any other suitable material, regardless of what the thickness or surface may be, is gripped by a suction cup, then bent on an angle with relation to the stack, and raised to a pair of feed rollers which deliver the article to the registering pins on the press. Another object of the invention is to provide means for automatically stopping the feeding operation the moment a sheet or article is not properly delivered to the registering pins on the press. Another object of the invention is to provide a feeding mechanism which will handle sheets, envelops, etc., of practically any thickness without necessitating adjustments of any kind. Further objects will hereinafter appear.

The invention consists of the parts and the construction and combination of parts as hereinafter more fully described and claimed, having reference to the accompanying drawings, in which—

Figure 1 is a side elevation of a printing press, showing the application of the invention.

Fig. 2 is a plan view in detail, showing the feeding and carrying mechanism.

Fig. 3 is a perspective view of the back stop on the paper holder.

Fig. 4 is a vertical section on line 4—4 of Fig. 1.

Fig. 5 is a vertical section on line 5—5 of Fig. 1.

Fig. 6 is an enlarged vertical section in detail of the paper feeding mechanism.

Fig. 7 is a detail view of the adjustable locking mechanism employed for limiting the upward movement of the suction cups.

Fig. 8 is a plan view of one of the suction cups, with connected lifting arm.

Fig. 9 is a side elevation of the gear train driving the paper feeding rolls and carrying mechanism.

Fig. 10 is a plan section on line 10—10 of Fig. 6.

Fig. 11 is a perspective view showing the inner pivotal mounting of the lifting arms by which the suction cups are carried.

Fig. 12 is a plan detail view of the hinge supporting the paper carrier, on line 12—12 of Fig. 6.

Fig. 13 is an enlarged detail side elevation of the timing mechanism, showing the normal position of same.

Fig. 14 is a similar view showing the tripped position of the timing mechanism.

Fig. 15 is an enlarged detail side elevation of the throw-out lever and the magnet by which it is operated.

Fig. 16 is an enlarged central section on line 16—16 of Fig. 2.

Fig. 17 is a perspective view of the paper spring guide.

Fig. 18 is a perspective view of the lug and clamp to which the spring guide is secured.

Fig. 19 is a perspective view of the paper contacting end of arm 76.

Fig. 20 is a diagrammatic view of the electric circuit which is controlled by the timing mechanism and the paper passing through the press.

Referring in detail to the drawings, A indicates the main frame of a printing press of suitable construction; 2 indicates the platen or pressure roller; 3 the bed of the press carrying the chase and type; and 4 the lever which reciprocates the bed of the press through means of the connecting-rod 5, crank-shaft 6 and the gears 7, which in turn are driven by a pulley 8 and motor 9.

Mounted adjacent to the platen or pressure roller 2 is a plurality of registering pins 10. These are depressed or lowered into the position shown at the time a sheet of paper is delivered by means of the carrier 11 and are similarly raised when the feed rollers 12 are turned in the direction shown to pass the paper between the platen 2 and the bed of the press. The mechanism by which the registering pins 10, platen 2 and bed 3 are operated does not form any part of the present invention.

Suitably secured, as at 13, to the end of the main frame A is a bracket frame 14. This is provided as a support for the paper holder 15 and the feeding mechanism by which the individual sheets of paper are raised and delivered to the carrier 11, which in turn conveys the paper to the registering pins 10 from where it is finally delivered to the platen 2 by means of the feed rollers 12. The paper carrier, holder or magazine 15 is pivotally mounted, as at 16, in the bracket frame 14 for the purpose of permitting it to be tilted to any angular position, as will hereinafter be described.

Secured on the rear end of the paper holder 15 is a downwardly extending slotted bracket 17 through which passes the thumb-screw 18. This forms a means by which the rear end of the paper holder may be lifted about the pivot 16 and secured, when adjusted. Mounted on the holder 15 is a pair of side plates 19 which are adjustable laterally of the holder. This is accomplished by slotting the holder, as at 20, to permit the screws 21, mounted in the guide plates, to pass therethrough, this being shown in detail in Fig. 4. An enlarged detail of the angular adjusting mechanism, comprising lug 17 and clamp screw 18, is shown in Fig. 5.

The adjustable mounting of the guide plates 19 is provided for the purpose of permitting sheets of paper of different widths to be placed upon the holder, and also for the purpose of adjusting the position of the sheets upon the holder. A stack of paper placed upon the holder is thus guided by the plates 19 and secured against endwise movement by a back stop 22, such as shown in Fig. 3. The forward end of the paper stack engages a plate 23 which is vertically slotted, as at 24, to permit a jet of air supplied by a bellows 25 to be passed therethrough.

By referring to Fig. 2, it will be seen that only a single narrow sheet of paper is being fed. The provision of the centrally disposed guide plate 19ª permits the feeding of two narrow sheets, cards, envelops, etc., as two cups are provided, one for each sheet. In actual practice it is found that one cup is sufficient where a narrow sheet is being fed and that two cups must be employed where comparatively wide sheets are being fed. The central guide plate 19ª is, therefore, removed when feeding sheets sufficiently wide to be gripped by the two cups shown.

Referring to Fig. 10, it will be seen that two or more slots 24 may be provided. The air supplied by the bellows 25 passes through a flexible tube 26 into a horizontal pipe 27 which is connected with a pair of vertically positioned, slotted tubes 28 positioned in register with slots 24 formed in plate 23. Each operation of the bellows 25 will force a blast of air through the slots 24 directly against the end of the paper stack indicated at 29 (see Fig. 6), and will force air between the sheets, causing these to separate.

Pivotally mounted, as at 30, on the rear end of the bracket frame 14 is a U-shaped arm 31, on the inner end of which is mounted a pair of suction cups 32. Connected with each cup is a flexible hose 33, the opposite ends of which are connected with a bellows 34. Reciprocation of the bellows, through means of the connection 35, with the main driving arm 4 causes a suction in cups 32 at the time these are brought to bear upon the topmost sheet of the paper stack 29. Upward movement of the arm 31 will then lift the topmost sheet, as it is gripped by the suction cups 32, to the dotted line position shown at 32ª, where the inner end of the sheet is brought to bear against the lower surface of a feed roller 34. The upward movement of the arm 31 is limited by a stop member 49ª. This stop is secured on a cross shaft 91 journaled in the frame, and turning movement of the shaft permits the stop to be adjusted; the shaft being locked against turning movement by means of the thumbscrew 51ª and the segment 52ª shown in Fig. 7. A second roller 35, mounted on the lower end of a crank-arm 36, is then moved to swing into the dotted line position shown at 36ª, and as roller 34 is continuously revolved in the direction of the arrow, by means of the gear train shown in Fig. 9, it will be seen that the lifted sheet will be gripped by the rollers and fed forward in the direction of arrows a and deposited upon the carrier 11, which, as previously described, delivers it to the registering pins and feed rollers 12.

The lifting of the arm 31, by which the suction cups 32 are carried, is accomplished as follows: Extending between and journaled in the outer ends of bracket 14 is a shaft 37, upon which the U-shaped arm 31 is loosely mounted. Secured to the shaft is a crank 38, and connected with one end of the crank is a link 39, the opposite end of which is connected with a crank pin 40 secured upon a timing disk 41 which is driven in unison with gear 7 and crank-shaft 6. The crank pin 40 extends into a block 42, slidably mounted on the link 39. The movement of the block 42 is limited in one direction by a stop screw 43 and is cushioned and partly limited in the opposite direction by means of a coil spring 44 and an adjustable set collar 45. The crank movement imparted by pin 40 to link 39 causes this, with connected crank 38, to reciprocate, and this reciprocating movement of the link and the oscillating movement of the crank is transmitted, through a second crank 38ª, to lift the U-shaped arm 31 to and from the paper stack 29.

The yielding connection between the crank pin 40 and link 39 is provided for two purposes: First, referring to Figs. 1 and 6 it will be seen that a stack of paper placed in position on the holder 15 between the guide plates 19 gradually decreases in height as the sheets are gradually removed. This necessarily requires a variable movement of arm 31. Second, referring to Fig. 1, it will be seen that movement of the crank in the direction of the arrow permits the arm 31 to move down into engagement with the paper. Further movement of the crank-arm releases arm 31 as no positive connection is made between the arm 38ª and arm 31. Arm 31, upon which the suction cups are mounted, is thus brought to rest on top of the paper stack and will not move up until the movement of link 39 and the crank is reversed. A period of rest is thus insured between each up and down movement of the arm, which is very beneficial as it gives the suction cups sufficient time to grip the topmost sheet. It, furthermore, permits a variable movement of the arm 31 as the stack decreases in height.

The detail views of the crank arm 38 and one side of arm 31 is shown in Fig. 11. The provision of the flexible connection between the link 39 and the crank pin 40 is, furthermore, beneficial as it permits a differential movement of arm 31 when this is lifted.

Referring to Fig. 1, with the crank pin 40 revolving in the direction of arrow $b$, it will be seen that link 39, with connected crank 38, is first slowly moved, as the movement of the crank pin is necessarily transmitted through the sliding block and the spring 44. A gradual compression of the spring takes place before the crank and arm 31 are lifted, and the starting or first movement of said arm is, therefore, slow. This is of considerable importance when feeding paper in the manner described, as the lifting of the topmost sheet, when removed slowly, is less liable to draw a second sheet with it than when it is moved quickly away from the stack.

Another important feature of the present invention is the construction of the suction cups. Referring to Fig. 6, it will be seen that the cup 32 is secured exteriorly of a downwardly projecting rigid member 48, in the form of a tube. When suction is transmitted through the tube 33 and member 48 it will be seen that the edge of the cup 32 resting on the topmost sheet will be drawn up into the dotted line position indicated at 32ᵇ, or, in other words, until the paper engages with the angularly positioned mouth of member 48. This movement of the suction cup lifts the end of the topmost sheet into the dotted line position shown at 49 where further movement is limited by the stop member 49ª. This produces a bending movement of the outer end of the sheet which thoroughly separates it from the other sheets before it is lifted by the arms. The comparatively slow movement of arm 31, caused by the gradual compression of spring 44, furthermore, tends to keep the sheets separated, as previously described. The slow movement of the arm 31, the bending of the sheet into the dotted line position 49, and the alternate blasts of air passing through the slots 24 directly against the end of the paper stack are all necessary and important as they all tend to separate the topmost sheet from the main stack.

The bending of the forward end of the sheet, by the suction cup, into the dotted line position 49 has proved, in practice, to be a great advantage, as it has more tendency to separate the topmost sheet from the stack than any other of the operations. If feeding comparatively thin sheets that have a tendency to stick together, it is found very desirable to increase this angular bending of the forward end of the sheet to the position 49. This is permitted by the pivotal mounting 16 of the holder 15. For instance, by raising it into the dotted line position shown at 15ª it can readily be seen that the angular forward bend 49 becomes still greater than when the stack is in a horizontal position, as shown in Fig. 6.

The timing of the suction bellows 34 and the blowing bellows 25 is such that each acts separately. The bellows 25 is preferably exhausting through the slots 24 while the suction cups are descending from the elevated position 32ª. The sheets are thus partly separated before the suction members contact with the topmost sheet. The bellows 34 is then actuated to produce a suction which is sufficiently strong to exhaust the cup 32 and collapse or draw it up to the position shown at 32ᵇ in Fig. 6, thus bending the outer end of the sheet to the position 49, previously described.

Movement of the link 39, through means of the timing disk 41, crank pin 40 and sliding block 42, then rocks the crank 38 and lifts the arm 31 into the elevated position where the sheet is removed by the action of the feed rollers 34 and 35. The timing or movement of the bellows 34 is, however, such that the suction is released a moment previous to the time that the paper is removed by the feed rollers. The lower roller 35, mounted on the arm 36′, is swung from the full line position shown to the dotted line position 36ª when the paper is removed. This is accomplished by means of a link 50 connected at one end to crank arm 36′ and at the other end to a lever 51 pivotally mounted, as at 52, on the side of the main frame A. This lever is rocked by means of a roller 53 carried by the timing disk 41. The lever is in this manner rocked once for every revolution of the timing disk, and this movement is transmitted, through link 50, to move the rocker arm 36 from the full line position to the dotted line position shown; the timing being such that the dotted line position is reached a moment after the topmost sheet has been elevated to the position shown at 32$^a$. The sheet is delivered by the rollers 34 and 35 to the carrier 11, which in turn delivers the sheet to the registering pins 10 of the press.

Another important feature of the present invention is the provision of means for stopping the feeding of paper when the sheet is not properly delivered to the registering pins. This is accomplished by throwing arm 36, with connected roller 35, out of operative position and this is accomplished as follows: Mounted in an offset 50$^a$, on the link 50, is a pair of electro-magnets 54, and pivoted adjacent to said magnets and operated by same is an armature 55. One end of the armature is so positioned that it will normally clear the lower end of a trip latch 56 when reciprocated or moved in unison with link 50. The trip latch 56 normally holds the throw-off lever 57 in the vertical position shown in Figs. 1 and 15. This throw-off mechanism forms no part of the present invention as it is already employed on a press of the character shown.

Mounted rearwardly of the registering pins 10 is a spring 58 which normally engages with an electric contact 59. The spring is connected through a wire 60 (see Fig. 20) with one side of a battery 61. The electric contact 59 is connected through wire 62 with one terminal of the electromagnets 54. The opposite terminal of said magnets is connected through a wire 63 with a spring contact 64, and the opposite terminal of battery 61 is connected through a wire 65 with one end of a pivotally mounted lever 66. Contact 59 and spring 58, as previously described, are mounted rearwardly of the registering pins 10. The electromagnets, with connected armature, are carried by the link 50. The spring contact 64 and the pivotally mounted arm 66 are carried by the upper end of lever 51, while the battery may be placed at any convenient point on or away from the press.

The delivery of a sheet of paper by the carrier 11 into the proper position, with relation to the registering pins 10, will cause the sheet to pass between the spring contact 58 and the terminal 59, in this manner breaking a circuit between same. Roller 53 carried by the timing disk is at the same time in a position where it engages the pivotally mounted arm 66, so as to move it into engagement with the spring contact 64. No current passes through the circuit shown in Fig. 20, as the circuit is broken by the paper sheet which is separated by the contact 58 and terminal 59. The circuit is, therefore, normally inoperative and the armature 55 will in this manner travel in its normal path below the trip latch 56. If a sheet is not delivered at the proper time to the registering pins, it will be seen that a circuit is formed through contact 58 and terminal 59. This circuit is completed the moment roller 53 swings arm 66 into engagement with contact 64. A complete circuit is thus established through the battery 61 and the magnets 54. The armature will then be attracted and its outer end 55$^a$ will be lifted into the dotted line position shown in Fig. 15 where it will engage with one end of the trip latch 56 and rock this in the direction of the arrow. The throw-off lever 57 is thus released and swings about its pivot 57$^a$ into the dotted line position shown, by reason of the tension of the spring 57$^b$.

Connecting the throw-off lever 57 and the link 50 is a flexible connection in the form of a wire rope or chain 68. This connection holds link 50 and lever 51 out of engagement with the timing disk 41 and roller 53 and at the same time holds the lever 36 and feed roller 35 in the full line position shown in Fig. 6. The paper raised by the suction cups 32 will be dropped after each elevation as the rollers are not in position to take the paper away. It can, therefore, be seen that failure of the feeding mechanism to deliver a sheet to the registering pins immediately trips the mechanism and locks link 50, with connected mechanism, in a position where feed roller 35 is inoperative, just preventing the delivery of sheets until the mechanism has been adjusted or the sheet that caused the trouble is removed. The failure of prompt delivery of a sheet by the rollers 34 and 35 and the carrier 11 to the registering pins 10 is caused by different conditions. For example, a sheet may be partly crumpled, turned, folded, or empty feed. Any of these conditions, or objections will cause a failure of the feeding mechanism to deliver the sheet at the proper time to the registering pins. A circuit is thus established through the separated circuit making or breaking devices shown at C and D (see Fig. 20) and the tripping mechanism is operated. The normal condition of the feeding mechanism is, however, that shown in Fig. 1 where the throw-off handle or lever 57 stands in a vertical position. The sheets are normally delivered to the registering pins and when so delivered break the circuit through the spring 58 and terminal 59.

The circuit is broken at this point, although it is established by lever 56 and spring contact 64. This, however, is not sufficient to complete the circuit and the circuit is only established when the two circuit making or breaking devices C and D are both closed and this only takes place when a sheet is not properly delivered.

Any suitable form of carrier 11 may be employed. The carrier here shown consists of a frame 70 pivotally mounted, as at 71, in the inner end of frame 14. Journaled in each end of the frame is a roller 72 over which passes a plurality of carrying tapes or belts 73, and mounted on a rod 74, extending crosswise of the frame, is one or more spring guides 75. Similarly secured on the rod is a pair of spring arms 76, the outer ends of which are provided with rollers 77 (see Fig. 19). The paper delivered by the feed rollers 34 and 35 and deposited upon the carrier is conveyed by the feed tapes or belts 73 between the spring guides 75 and the arms 76. The arms 76 prevent the sheet from flying up or off of the belts 73 as it passes with considerable speed in a downward direction, while the spring guides 75 guide the sheet into perfect position with relation to the registering pins. The length of the carrier 11 and the provision of the guide members 75 is of great importance as they provide a means whereby the sheet is delivered into proper position with relation to the registering pins. A perfect register is thus obtained with the present mechanism which is practically unobtainable by automatic feeders heretofore devised.

Another important feature of the present invention is the provision of two suction cups 32. These may be adjusted laterally in and out on the U-shaped arm 31 and preferably positioned to engage the extreme outer edges of the sheet. This manner of grasping the sheet permits a slight bulging of the sheets in the center, in this manner permitting the air discharged through the slots 24 to maintain the sheets separated. This is important, as most feeders generally engage the sheet in the central position and consequently force the air out from between the sheets every time the suction cups come into engagement with the stack. This is obviated in the present instance by placing the suction cups to engage the sheets near the outer edges, thus permitting the sheets to bulge centrally and be separated by the air blast just described.

Another important feature of the present invention is the pivotal mounting of the arms 31. By referring to Figs. 1 and 6 it will be seen that the cups 32, secured between the arms, swing on an arc of a circle, pulling the sheet away from the front gage or plate 23 and thereby eliminating all friction against the end of the sheet while it is being raised from the stack to the feeding rollers 34 and 35. This arcuate movement is, furthermore, important as it permits the individual sheets to be grasped closer to the end as the stack decreases in height. Great speed is in this manner obtainable as the sheets are grasped proportional to the lift, or closer and closer to the end as the distance traveled or lifted increases.

Having thus described my invention, what I claim and desire to secure by Letters Patent is—

1. The combination with a paper holder and a stack of paper supported thereby, of an arm pivotally mounted below the support adjacent to one end thereof, the free end of said arm being positioned to permit it to travel in a circular vertical arc continuously away from the front stop of the paper stack while traveling in an upward direction and continuously toward the front stop when traveling downwardly toward the stack, a suction cup mounted on the free end of the arm, means for producing a suction in the cup during the upward movement of the arm and cup to grip and elevate the topmost sheet on the stack, means for relieving the suction to release the sheet when it has been elevated to a predetermined height, and means for removing the sheet when released.

2. The combination with a paper holder and a stack of paper supported thereby, of an arm pivotally mounted below the support adjacent to one end thereof, the free end of said arm being positioned to permit it to travel in a circular vertical arc to and from the stack, a suction cup mounted on the free end of the arm, means for producing a suction in the cup during the upward movement of the arm and cup to grip and elevate the topmost sheet on the stack, means for relieving the suction to release the sheet when it has been elevated to a predetermined height, means for removing the sheet when released, and a yielding connection for the arm and cup to a predetermined height with relation to the stack.

3. The combination with a paper holder and a stack of paper supported thereby, of an arm pivotally mounted below the support adjacent to one end thereof, the free end of said arm being positioned to permit it to travel in a circular vertical arc continuously away from the front stop of the paper stack while traveling in an upward direction and continuously toward the front stop when traveling downwardly toward the stack, a suction cup mounted on the free end of the arm, means for producing a suction in the cup during the upward movement of the arm and cup to grip and elevate the topmost sheet on the stack, means for relieving the suction to release the sheet when it has been elevated to a predetermined height, means for removing the sheet when released, and means for permitting the arm and cup, when descending, to stop when in engagement with the topmost sheet regardless of the height of the stack.

4. The combination with a paper holder and a stack of paper supported thereby, of an arm pivotally mounted below the support adjacent to one end thereof, the free end of said arm being positioned to permit it to travel in a circular vertical arc continuously away from the front stop of the paper stack while traveling in an upward direction and continuously toward the front stop when traveling downwardly toward the stack, a suction cup mounted on the free end of the arm, means for producing a suction in the cup during the upward movement of the arm and cup to grip and elevate the topmost sheet on the stack, means for relieving the suction to release the sheet when it has been elevated to a predetermined height, means for removing the sheet when released, means for positively lifting the arm and cup to a predetermined height with relation to the stack, and means for permitting the arm and cup, when descending, to stop when in engagement with the topmost sheet regardless of the height of the stack.

5. The combination with a paper holder and a stack of paper supported thereby, of an arm pivotally mounted below the support adjacent to one end thereof, the free end of said arm being positioned to permit it to travel in a circular, vertical arc continuously away from the front stop of the paper stack while traveling in an upward direction and continuously toward the front stop when traveling downwardly toward the stack, a suction cup mounted on the free end of the arm, means for producing a suction in the cup during the upward movement of the arm and cup to grip and elevate the topmost sheet on the stack, means for relieving the suction to release the sheet when it has been elevated to a predetermined height, a power-operated bell-crank pivotally mounted adjacent to the pivotal end of the suction cup arm, and a projection on the bell-crank engageable with the cup arm to raise and lower the same.

6. The combination with a paper holder and a stack of paper supported thereby, of an arm pivotally mounted below the support adjacent to one end thereof, the free end of said arm being positioned to permit it to travel in a circular, vertical arc continuously away from the front stop of the paper stack while traveling in an upward direction and continuously toward the front stop when traveling downwardly toward the stack, a suction cup mounted on the free end of the arm, means for producing a suction in the cup during the upward movement of the arm and cup to grip and elevate the topmost sheet on the stack, means for relieving the suction to release the sheet when it has been elevated to a predetermined height, a power-operated bell-crank pivotally mounted adjacent to the pivotal end of the suction cup arm, and a projection on the bell-crank movable into and out of engagement with the cup arm to raise and lower the same with relation to the stack.

7. The combination with a paper holder and a stack of paper supported thereby, of an arm pivotally mounted below the support adjacent to one end thereof, the free end of said arm being positioned to permit it to travel in a circular, vertical arc to and from the stack, a suction cup mounted on the free end of the arm, means for producing a suction in the cup during the upward movement of the arm and cup to grip and elevate the topmost sheet on the stack, means for relieving the suction to release the sheet when it has been elevated to a predetermined height, a bell-crank pivotally mounted adjacent to the pivotal end of the suction cup arm, means connected with one end of the bell-crank for continuously rocking the bell-crank a fixed distance, a yielding connection interposed between said means and the bell-crank, and a projection on the bell-crank movable into and out of engagement with the suction cup arm to raise and lower the same with relation to the stack.

8. The combination with a paper holder and a stack of paper supported thereby, of an arm pivotally mounted below the support adjacent to one end thereof, the free end of said arm being positioned to permit it to travel in a circular, vertical arc to and from the stack, a suction cup mounted on the free end of the arm, means for producing a suction in the cup during the upward movement of the arm and cup to grip and elevate the topmost sheet on the stack, means for relieving the suction to release the sheet when it has been elevated to a predetermined height, a bell-crank pivotally mounted adjacent to the pivotal end of the suction cup arm, means connected with one end of the bell-crank for continuously rocking the bell-crank a fixed distance, a yielding connection interposed between said means and the bell-crank, and a connection formed between the bell-crank and suction cup arm to raise and lower said arm, said connection permitting a variable movement of the suction cup arm both in raising and lowering.

9. The combination with a paper holder and a stack of paper supported thereby, of a suction cup adapted to move in a circular vertical arc to and from the stack, means for producing a suction in the cup during the upward movement of same to grip and elevate the topmost sheet in the stack, means for relieving the suction when the sheet has been elevated to a predetermined height and for removing the sheet when released, and means for limiting the upward movement of the cup.

10. The combination with a paper holder and a stack of paper supported thereby, of a suction cup adapted to move in a circular vertical arc to and from the stack, means for producing a suction in the cup during the upward movement of same to grip and elevate the topmost sheet in the stack, means for relieving the suction when the sheet has been elevated to a predetermined height and for removing the sheet when released, means for limiting the upward movement of the cup, and means for limiting the downward movement of the cup.

11. The combination with a paper holder and a stack of paper supported thereby, of a suction cup adapted to move in a circular vertical arc to and from the stack, means for producing a suction in the cup during the upward movement of same to grip and elevate the topmost sheet in the stack, means for relieving the suction when the sheet has been elevated to a predetermined height and for removing the sheet when released, means for limiting the upward movement of the cup, and means for permitting the cup, when descending, to stop when in engagement with the topmost sheet whether the stack is high or low.

12. The combination with a paper holder and a stack of paper supported thereby, of a suction cup adapted to move in a circular vertical arc to and from the stack, means for producing a suction in the cup during the upward movement of same to grip and elevate the topmost sheet in the stack, means for relieving the suction when the sheet has been elevated to a predetermined height and for removing the sheet when released, and means for tilting and supporting the paper holder to permit the sheets to assume an angular position with relation to the cup.

13. The combination with a paper holder and a stack of paper supported thereby, of a suction cup adapted to move in a circular vertical arc to and from the stack, means for producing a suction in the cup during the upward movement of same to grip and elevate the topmost sheet in the stack up into engagement with a revolving roller, means for relieving the suction when this position has been reached, means for moving a second revolving roller into engagement with the sheet and the first-named roller to remove the sheet, and means for limiting the upward movement of the cup.

14. The combination with a paper holder and a stack of paper supported thereby, of a suction cup adapted to move in a circular vertical arc to and from the stack, means for producing a suction in the cup during the upward movement of same to grip and elevate the topmost sheet in the stack up into engagement with a revolving roller, means for relieving the suction when this position has been reached, means for moving a second revolving roller into engagement with the sheet and the first-named roller to remove the sheet, and means for tilting and supporting the paper holder to permit the sheets to assume an angular position with relation to the cup.

15. The combination with a paper holder and a stack of paper supported thereby, of a suction cup adapted to move in a circular vertical arc to and from the stack, means for producing a suction in the cup during the upward movement of same to grip and elevate the topmost sheet in the stack up into engagement with a revolving roller, means for relieving the suction when this position has been reached, means for moving a second revolving roller into engagement with the sheet and the first-named roller to remove the sheet, and means for tilting and supporting the paper holder to permit the sheets to assume an angular position with relation to the cup.

16. The combination with a paper holder and a stack of paper supported thereby, of an arm pivotally mounted adjacent to one end of the stack, the free end of said arm being positioned to permit it to travel in a circular, vertical arc to and from the stack, a tubular member secured to the free end of the arm connected with a source of vacuum supply, said tubular member adapted to engage the top-most sheet in the stack and having its lower engaging end shaped to assume an angle with relation to the surface of the stack, and a flexible contractible, suction cup surrounding and secured to the tubular member having its lower end adapted to extend below the lower end of the tubular member and also adapted, when suction or vacuum is applied, to contract lengthwise to raise one end of the topmost sheet up into engagement or contact with the angular bottom face of the tubular member.

17. The combination with a paper holder and a stack of paper supported thereby, of a suction cup adapted to move in a circular vertical arc to and from the stack, means for producing a suction in the cup during the upward movement of same to grip and elevate the topmost sheet in the stack, means for relieving the suction when the sheet has been elevated to a predetermined height and for removing the sheet when released, means for tilting and supporting the paper holder to permit the sheets to assume an angular position with relation to the cup, and means for forcing a blast of air at fixed intervals through the sheets endwise.

18. The combination with a paper holder and a stack of paper supported thereby, of a suction cup adapted to move in a circular vertical arc to and from the stack, means for producing a suction in the cup during the upward movement of same to grip and elevate the topmost sheet in the stack up into engagement with a revolving roller, means for relieving the suction when this position has been reached, means for moving a second revolving roller into engagement with the sheet and the first-named roller to remove the sheet, and means for forcing a blast of air at fixed intervals through the sheets endwise.

19. The combination with a paper holder and a stack of paper supported thereby, of a suction cup adapted to move in a circular vertical arc to and from the stack, means for producing a suction in the cup during the upward movement of same to grip and elevate the topmost sheet in the stack up into engagement with a revolving roller, means for relieving the suction when this position has been reached, means for moving a second revolving roller into engagement with the sheet and the first-named roller to remove the sheet, means for limiting the upward movement of the cup, and means for forcing a blast of air at fixed intervals through the sheets endwise.

20. The combination with a paper holder and a stack of paper supported thereby, of a suction cup adapted to move in a circular vertical arc to and from the stack, means for producing a suction in the cup during the upward movement of same to grip and elevate the topmost sheet in the stack up into engagement with a revolving roller, means for relieving the suction when this position has been reached, means for moving a second revolving roller into engagement with the sheet and the first-named roller to remove the sheet, means for tilting and supporting the paper holder to permit the sheets to assume an angular position with relation to the cup, and means for forcing a blast of air at fixed intervals through the sheets endwise.

21. The combination with a paper holder and a stack of paper supported thereby, of a suction cup adapted to move in a circular vertical arc to and from the stack, means for producing a suction in the cup during the upward movement of same to grip and elevate the topmost sheet in the stack up into engagement with a revolving roller, means for relieving the suction when this position has been reached, means for moving a second revolving roller into engagement with the sheet and the first-named roller to remove the sheet, means for tilting and supporting the paper holder to permit the sheets to assume an angular position with relation to the cup, and means for forcing a blast of air at fixed intervals through the sheets endwise.

22. The combination with a paper holder and a stack of paper supported thereby, of a suction cup adapted to be raised and lowered with relation to the top of the stack, said suction cup comprising a tubular member, the lower contacting end of which is shaped to assume an angle with relation to the surface of the stack, a flexible, contractible suction cup surrounding and secured to the tubular member having its lower end extending below the lower angular bottom of the tube, means for producing a suction in the tube and connected flexible, contractible cup previous to and during the upward movement of said members first to permit contraction lengthwise of the cup to raise one end of the topmost sheet up into engagement with the angular bottom face of the tube and second to grip or hold the sheet in said position while said members are being raised, means for relieving the suction to release the sheet when it has been raised to a predetermined height, and means for removing the sheet when released.

23. In a paper feeding mechanism, a movable arm, a tubular member carried by the arm connected with a source of vacuum supply, a holder adapted to support a stack of paper, and means for lifting the arm and tube in a vertical direction to and away from one end of the topmost sheet in the stack, the lower end of said tube adapted to assume an angular position with relation to the plane of the topmost sheet to permit the end of the sheet engaged by the tube to bend in an upward direction against the angular face of the tube when vacuum is applied.

24. The combination with a paper holder and a stack of paper supported thereby, of an arm adapted to move in a vertical direction to and away from the stack, a tubular member carried by the arm having its lower end angularly disposed with relation to the plane of the stack and connected with an intermittent source of vacuum supply, and a flexible, contractible suction cup surrounding and secured to the tubular member and having its lower end adapted to extend below the lower end of the tubular member.

25. The combination with a paper holder and a stack of paper supported thereby, of an arm adapted to move in a vertical direction to and away from the stack, a tubular member carried by the arm having its lower end angularly disposed with relation to the plane of the stack and connected with an intermittent source of vacuum supply, a flexible, contractible suction cup surrounding and secured to the tubular member and having its lower end adapted to extend below the lower end of the tubular member, and a heavy reinforced annular edge formed on the lower end of the suction cup.

26. The combination with a paper holder and a stack of paper supported thereby, of an arm adapted to move in a vertical direction to and away from the stack, a tubular member carried by the arm having its lower end angularly disposed with relation to the plane of the stack and connected with an intermittent source of vacuum supply, a flexible, contractible suction cup surrounding and secured to the tubular member and having its lower end adapted to extend below the lower end of the tubular member, and means for directing a blast of air at fixed intervals against the end of the paper stack.

In testimony whereof I have hereunto set my hand in the presence of two subscribing witnesses.

ABRAHAM BLOCK.

Witnesses:
 JOHN H. HERRING,
 W. W. HEALEY.